United States Patent
Arora et al.

(10) Patent No.: US 9,471,130 B2
(45) Date of Patent: *Oct. 18, 2016

(54) CONFIGURING IDLE STATES FOR ENTITIES IN A COMPUTING DEVICE BASED ON PREDICTIONS OF DURATIONS OF IDLE PERIODS

(71) Applicant: Advanced Micro Devices, Inc., Sunnyvale, CA (US)

(72) Inventors: Manish Arora, Dublin, CA (US); Nuwan S. Jayasena, Sunnyvale, CA (US); Michael J. Schulte, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 14/063,194

(22) Filed: Oct. 25, 2013

(65) Prior Publication Data

US 2015/0121057 A1    Apr. 30, 2015

(51) Int. Cl.
*G06F 1/32*    (2006.01)

(52) U.S. Cl.
CPC ........... *G06F 1/3228* (2013.01); *G06F 1/3243* (2013.01); *G06F 1/3287* (2013.01); *Y02B 60/1239* (2013.01); *Y02B 60/1282* (2013.01)

(58) Field of Classification Search
CPC ....................................................... G06F 1/32
USPC ........................................................ 713/300
See application file for complete search history.

(56) References Cited

U.S. PATENT DOCUMENTS

| | | | | |
|---|---|---|---|---|
| 2005/0153995 A1* | 7/2005 | Vig | ....................... | C07D 239/47 514/269 |
| 2007/0288735 A1* | 12/2007 | Vasekin | .............. | G06F 9/30101 712/239 |
| 2008/0141265 A1* | 6/2008 | Choi | ....................... | G06F 1/3203 718/105 |
| 2009/0158067 A1* | 6/2009 | Bodas | ................... | G06F 1/3287 713/323 |
| 2010/0138456 A1* | 6/2010 | Aghili | ........................... | 707/803 |
| 2011/0040994 A1* | 2/2011 | Basak | ................... | G06F 1/3203 713/324 |
| 2011/0040995 A1* | 2/2011 | Basak et al. | ................... | 713/324 |
| 2012/0124235 A1* | 5/2012 | Nandagopal | ............ | H04L 45/12 709/238 |
| 2013/0238628 A1* | 9/2013 | Behnen et al. | ............... | 707/741 |

OTHER PUBLICATIONS

AMD, Bios and Kernel Developers Guide, rev. 3.14, Jan. 2013.
Hu et al., Microarchitectural Techniques for Power Gating of Execution Units, ISLPED, Aug. 2004.

* cited by examiner

*Primary Examiner* — Mohammed Rehman
(74) *Attorney, Agent, or Firm* — Park, Vaughan, Fleming & Dowler LLP

(57) ABSTRACT

The described embodiments include a computing device with an entity (a processor, a processor core, etc.) and a controller. In these embodiments, the controller, using an idle duration history, predicts a duration of a next idle period for the entity. Based on the predicted duration of the next idle period, the controller configures the entity to operate in a corresponding idle state.

17 Claims, 3 Drawing Sheets

CONFIGURING IDLE STATES FOR ENTITIES IN A COMPUTING DEVICE BASED ON PREDICTIONS OF DURATIONS OF IDLE PERIODS

BACKGROUND

1. Field

The described embodiments relate to computing devices. More specifically, the described embodiments relate to using an idle duration history to configure an idle state of an entity in a computing device.

2. Related Art

In many computing devices, entities (i.e., processors, processor cores, etc.) encounter idle periods, which are periods of time during which an entity is idle and does not complete computational operations. During idle periods, some of these entities select an idle state from a set of idle states and transition to the selected idle state to conserve power. For such entities, each idle state in the set of idle states has different settings for one or more operating parameters (e.g., voltages, clock frequencies, etc.) for one or more parts of the entity. For example, in some idle states, one or more controlling clocks can be reduced in frequency or halted to one or more of processing circuits, interrupt circuits, interface circuits, etc. for the entity. As another example, in some idle states, one or more input voltages can be reduced (possibly to 0V) to one or more of processing circuits, interrupt circuits, interface circuits, etc. for the entity. Some of these entities use at least some of the idle states from a well-known set of states that includes states C0-C6.

In these computing devices, transitioning an entity into and back out of some of the idle states incurs delay due to operations that are performed to enable the transition. For example, for entities that support the C0-C6 states, when transitioning from the C0 state (full power) to the C6 idle state (deep power down) a delay is incurred because architectural state such as values in registers, values in caches, state variables, etc. must be preserved by writing the architectural state to a memory (e.g., to disk, to a memory, to a lower-level cache, and/or to another location) before one or more voltages in the entity are reduced to a level lower than the level required to maintain the architectural state within the entity. As another example, when transitioning from the C6 idle state to the C0 state a delay is incurred because, after the one or more voltages are restored to levels sufficient to maintain the architectural state within the entity, preserved architectural state such as values for registers, etc. must be recovered from the memory and used to set architectural state for the entity.

Because transitioning into and back out of some idle states incurs delays, making such a transition can cause inefficient operation for the entity (and, more generally, the computing device) when the transition is made at the wrong time. For example, if an idle period is shorter than a given duration, the delay incurred for making the transitions into and back out of the idle state can be longer than the idle period, meaning that the transition results in unnecessary delay for the entity. In addition, the transition to the idle state has a cost in terms of power expended to transition into and back out of the idle state. If the idle period is not sufficiently long, the power conserved by entering the idle state can be exceeded by the power expended to transition into and back out of the idle state.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Terminology

In the following description, various terms may be used for describing embodiments. The following section provides a simplified and general description of some of these terms. Note that some or all of the terms may have significant additional aspects that are not recited herein for clarity and brevity and thus these descriptions are not intended to limit the terms.

Entities: entities include a portion of the hardware in a computing device and/or software executing on a computing device that can perform the operations herein described. For example, entities can include, but are not limited to, one or more processors (e.g., central processing units (CPUs), graphics processing units (GPUs), accelerated processing units (APUs), etc.), one or more processor cores (e.g., CPU cores, GPU cores, etc.) and/or one or more threads executing on one or more CPU cores, APU cores, or GPU cores, a compute unit in a core, an application specific integrated circuits (ASIC), a microcontroller, a digital signal processor, a software process executing on a processing circuit, or some combination thereof.

Architectural state: the architectural state of an entity in a computing device (e.g., a processor, a processor core, etc.) includes data and information stored/held in the entity that may be used by other entities in the computing device (e.g., accessed, read, overwritten, modified, etc.). Generally, the data and information comprises any type(s) of data and information held in the entity that can be used by other entities, such as data stored in memories and/or caches, data stored in registers, state information (flags, values, indicators, etc.), etc.

Overview

The described embodiments include a computing device with entities that encounter idle periods while performing computational work. Idle periods are generally periods of time during which an entity should not or does not perform computational work. In these embodiments, the computing device determines idle states to which entities transition during idle periods (idle states are described in more detail below). More specifically, during operation, a controller in the computing device (e.g., a thermal power management unit) predicts a duration of a next idle period for an entity based on the durations of previous idle periods. The controller then uses the predicted duration of the idle period to determine an idle state to which the entity is to transition during the idle period.

In some embodiments, the controller uses two records for predicting a duration of a next idle period: (1) an idle duration history and (2) a history table. The idle duration history includes set of representations of the durations (i.e., values that represent the durations) of each of N previous idle periods (where N is 8, 14, or another number). The history table includes a set of predictions for the durations of idle periods, each of which is associated with a separate index. In these embodiments, when predicting the duration of a next idle period, the controller first computes an index value based on the idle duration history. For example, in some embodiments, the controller concatenates together the representations from the idle duration history to form the index value. As another example, in some embodiments, the controller computes the index value using a hash function, the input of the hash function including some or all of the representations from the idle duration history. The controller then uses the computed index value to retrieve a prediction of the duration of the next idle period from the history table.

In some embodiments, the controller uses one or more thresholds for idle period duration to determine the idle state in which the entity is to operate during the next idle period. In these embodiments, each of the thresholds is associated with at least one corresponding idle state. To use the thresholds, after computing the predicted duration for the next idle period, the controller determines which of the thresholds is best met by the predicted duration and then determines that the entity is to operate in an associated idle state during the next idle period. For example, in these embodiments, based on the thresholds, if the predicted duration of the idle period is not long enough, during the next idle period, the entity may be transitioned to an idle state for which architectural state is maintained in the entity, instead of being transitioned into a idle state where architectural state is lost in the entity (e.g., by reducing one or more voltages for the entity below a state-sustaining voltage, etc.). In this way, for idle periods that are predicted to be of shorter duration, the entity need not preserve the architectural state (e.g., copy values in registers, values in caches, state variables, etc. to disk, to a memory, to a lower-level cache, and/or to another location) before transitioning to the idle state.

By using the predicted duration of a next idle period to determine the idle state in which the entity operates, the described embodiments can avoid the entity transitioning to and from certain idle states during idle periods that are shorter than the delay involved in transitioning to and from the idle states and/or for which the power consumed in preserving architectural state is greater than the power saved by transitioning to the idle state. This can in turn improve the operation of the computing device. By using the idle duration history and the history table to compute the predicted duration, the described embodiments can more accurately compute the duration of idle periods, which can improve the accuracy of the decision regarding the idle state in which the entity is to operate.

Computing Device

Figure 1:
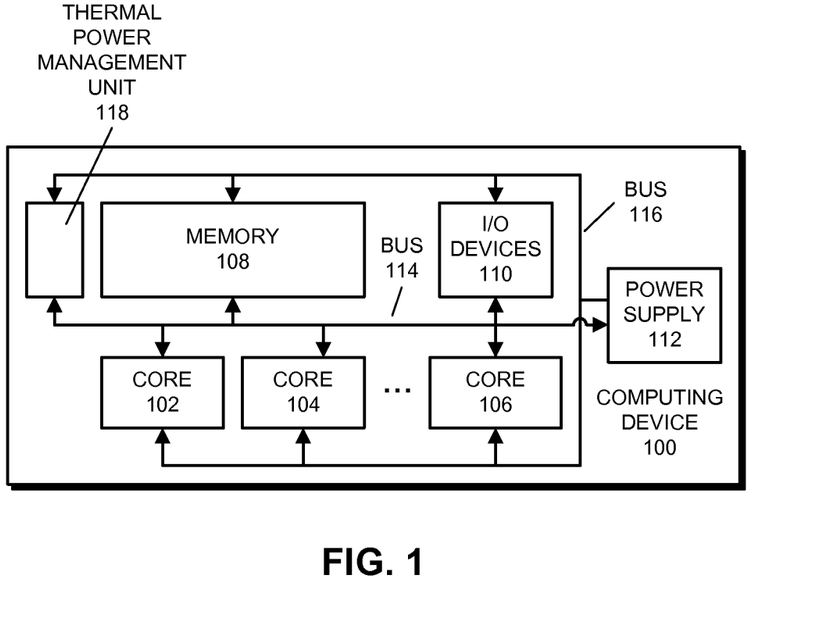
FIG. 1 presents a block diagram illustrating a computing device in accordance with some embodiments.

FIG. 1 presents a block diagram illustrating a computing device 100 in accordance with some embodiments. As can be seen in FIG. 1, computing device 100 includes cores 102-106, memory 108, input-output (I/O) devices 110, power supply 112, buses 114 and 116, and thermal power management unit 118. Cores 102-106 are functional blocks such as one or more of CPU cores, GPU cores, ASICs, microcontrollers, programmable logic devices, embedded processors, etc. that are configured to perform computational operations in computing device 100. For example, in some embodiments, cores 102 and 104 are CPU cores and core 106 is a GPU core.

Memory 108 is a functional block that includes memory circuits, control circuits, etc. that form a "main memory" in and for computing device 100. Memory 108 is used by functional blocks such as cores 102-106, I/O devices 110, etc. for storing instructions and data that are used for performing computational operations in computing device 100. In some embodiments, memory 108 includes memory circuits such as one or more of static random access memory (SRAM), dynamic random access memory (DRAM), double data rate synchronous DRAM (DDR SDRAM), and/or other types of memory circuits.

I/O devices 110 is a functional block that includes circuits for performing various types of input and/or output from computing device 100. In some embodiments, I/O devices 110 includes hardware (circuits, elements, etc.) and software (firmware, program code, etc.) for communicating with, controlling, configuring, and/or otherwise handling disk drives, human-interface devices, display monitors, network connections, printers, peripherals, and/or other devices associated with computing device 100.

Power supply 112 is a functional block that is configured to provide electrical power to other functional blocks such as cores 102-106, memory 108, etc. in computing device 100. In some embodiments, power supply 112 includes circuits that receive power signals from a source (e.g., a wall plug, a battery, etc.) at a corresponding voltage and current and generate therefrom various voltages and currents to be used to provide power to the other functional blocks in computing device 100.

Computing device 100 also includes various signal lines, busses, electrical connections, proximity connections, optical connections, etc. that are used by the functional blocks for communicating with one another. For example, in some embodiments, cores 102-106, memory 108, I/O devices 110, power supply 112, and thermal power management unit 118 may use one or more busses such as bus 114 to communicate between one another. In these embodiments, each of the one or more buses may include any number of signal paths (e.g., electrical connections such as wires and pads, conductive or capacitive connections, optical channels, etc.) that are used for communicating between the functional blocks. As another example, power supply 112 may use a bus such as bus 116 for communicating various power signals (i.e., signals of corresponding currents and voltages) to other functional blocks in computing device 100.

Figure 2:
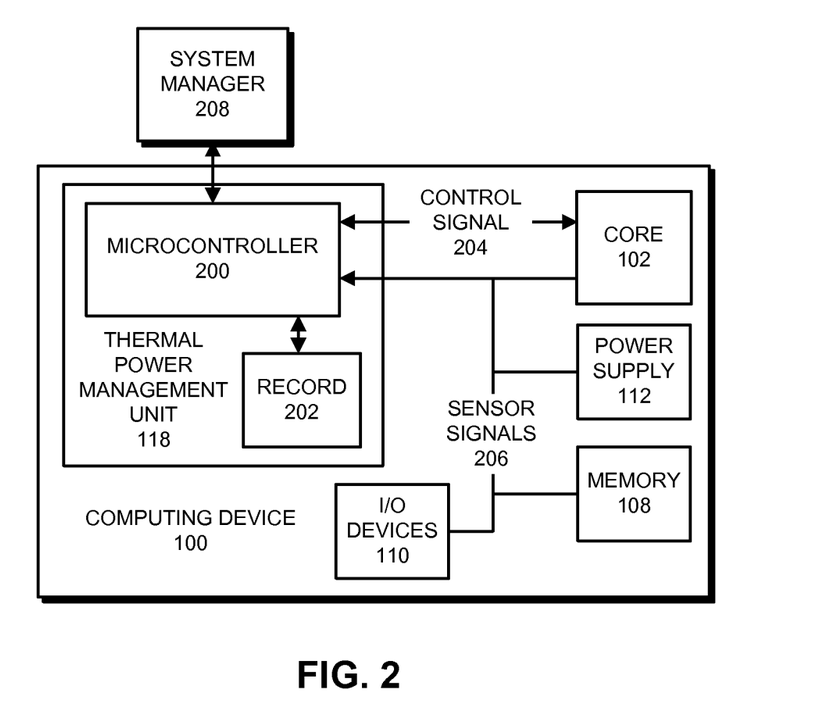
FIG. 2 presents a block diagram illustrating a thermal power management unit in a computing device accordance with some embodiments.

Thermal power management unit 118 is a functional block that performs operations for ensuring that entities in computing device 100 (e.g., one or more of cores 102-106, etc.) operate within thermal thresholds (e.g., so that entities operate at temperatures lower than one or more corresponding thresholds/limits, etc.). These operations can include operations such as throttling entities by reducing clock frequencies, voltages, etc. to avoid the entities exceeding thermal thresholds (e.g., due to resistive heating, etc.) in the entity. For example, in some embodiments, thermal power management unit 118 is configured to select an idle state into which an entity is to transition during a next idle period based on a predicted duration of an idle period for the entity. FIG. 2 presents a block diagram illustrating thermal power management unit 118 in computing device 100 accordance with some embodiments. As can be seen in FIG. 2, thermal power management unit 118 includes microcontroller 200 and record 202. Thermal power management unit 118 is coupled to system manager 208.

Microcontroller 200 is a functional block that is configured to perform monitoring operations, data collection (e.g., via sensor signals 206 and/or other sensor signals), computations, control signaling (e.g., via control signal 204 and/or other control signals), device management, and/or other operations within thermal power management unit 118 for ensuring that entities in computing device 100 operate within the thermal thresholds. For example, in some embodiments, microcontroller 200 computes a predicted duration of the next idle period using an idle duration history and a history table. Microcontroller 200 then uses the predicted duration to determine an idle state to which the entity is to transition during the next idle period and causes the entity to transition to the idle state during the next idle period. Microcontroller 200 includes one or more of a processor core, a digital signal processor, an embedded processor core or microcontroller, an application-specific circuit, a programmable logic circuit, etc.

Record 202 is a functional block that is configured to keep records of data related to idle period durations and predictions to be used in computing predicted durations for idle periods. In some embodiments, record 202 includes memory circuits (e.g., registers, RAM, etc.) that are used for keeping the records of the data, along with control circuits used for handling the data. For example, in some embodiments, record 202 includes a register that is used for storing the idle duration history and memory circuits for storing the history table, along with control circuits for accessing/managing the idle duration history and the history table. In some embodiments, record 202 also includes memory circuits used for storing metadata that is used for computing predicted durations of idle periods, verifying predictions, improving the accuracy of predictions, etc. For example, record 202 may store metadata such as hardware and/or software sensor data associated with one or more idle periods, idle period duration prediction records, idle period counters, error records, etc.

In some embodiments, microcontroller 200 (or another functional block in computing device 100) is configured to determine that idle periods have occurred and/or idle period durations for entities (e.g., cores 102-106, etc.) in computing device. For example, in some embodiments, for each idle period, microcontroller 200 receives data on sensor signals 206 (e.g., I/O rate data, memory read/write rate data, instruction execution data, idle period data, etc.) from one or more other functional blocks in computing device 100 and uses the data to determine that the idle period has occurred and how long the duration of the idle period was. As another example, in some embodiments, microcontroller 200 receives a communication indicating the duration of each idle period from a functional block in computing device 100 (e.g., core 102). Microcontroller 200 then uses the idle period durations as described herein.

In some embodiments, thermal power management unit 118 receives, from system manager 208, configuration information that thermal power management unit 118 uses to configure itself and/or other functional blocks. For example, system manager 208 may send configuration information for configuring one or more idle states, idle period duration thresholds and corresponding idle states, number of idle periods in the idle duration history, number of predictions in the history table, length/size of index in history table, etc. In some embodiments, system manager 208 is located outside computing device (e.g., is connected to computing device via an external connection, via a network connection, etc.). In some embodiments, system manager 208 is located inside of computing device, such as in a support processor, a system management unit, etc.

Although an embodiment is described with a particular arrangement of cores 102-106, some embodiments include a different number and/or arrangement of cores (as shown by the ellipsis in FIG. 1). For example, some embodiments have one, two, five, or another number of cores. Generally, the described embodiments can use any arrangement of cores that can perform the operations herein described.

Also, although various functional blocks are shown in FIG. 1, some embodiments include more or fewer functional blocks. For example, in some embodiments, some or all of thermal power management unit 118 is included within another functional block within computing device 100 (e.g., within cores 102-106, etc.), so that one or more functional blocks have a separate thermal power management unit 118. As another example, in some embodiments, some or all of thermal power management unit 118 is separate from computing device 100. Generally, computing device 100 includes sufficient functional blocks to perform the operations herein described.

In addition, computing device 100 is simplified for illustrative purposes. In some embodiments, computing device 100 includes additional functional blocks, mechanisms, buses, etc. for performing the operations herein described and other operations. For example, computing device 100 may include power systems (batteries, plug-in power sources, etc.), caches, mass-storage devices such as disk drives or large semiconductor memories, media processors, input-output mechanisms, communication mechanisms, networking mechanisms, display mechanisms, communication buses, power buses, etc.

Moreover, although FIG. 2 shows some of the functional blocks that are shown in FIG. 1, some functional blocks (e.g., cores 104-106) are not shown for clarity. In addition, buses 114 and 116 are not shown (control signals 204 and/or sensor signals 206 may be included as part of bus 114). Generally, the operations described for FIG. 2 may be performed using any combination of functional blocks that can perform the operations herein described and for any entity for which predicted idle period durations can be computed and which can be caused to transition into a corresponding idle state. For example in some embodiments, some or all of the records of data related to idle period durations and predictions and metadata is held in one or more other functional blocks (e.g., in the entity, in memory 108, in a cache, etc.) but are accessible and otherwise usable as described herein. As another example, in some embodiments, some or all of the operations herein described as being performed by microcontroller 200 may be performed by another functional block (e.g., one of cores 102-106, etc.). As yet another example, in some embodiments, an operating system or a monitoring application executing in computing device 100 (e.g., executing on one or more of cores 102-106) performs some or all of the operations. In these embodiments, the operating system or application can interact with thermal power management unit 118 and/or another functional block for acquiring the idle duration history, history table, idle states, thresholds, etc. and/or can store these values in memory 108. As still another example, in some embodiments, thermal power management unit 118 includes a co-processor (processor/processor core, embedded processor, digital signal processor, programmable logic circuit, etc.) separate from microcontroller 200 that performs some or all of the computational operations.

Computing device 100 may be included in or may be any of various electronic devices. For example, computing device may be included in or be a desktop computer, a server computer, a laptop computer, a tablet computer, a smart phone, a toy, an audio/visual device (e.g., a set-top box, a television, a stereo receiver, etc.), a piece of network hardware, a controller, and/or another electronic device or combination of devices.

Idle Duration History

Figure 3:
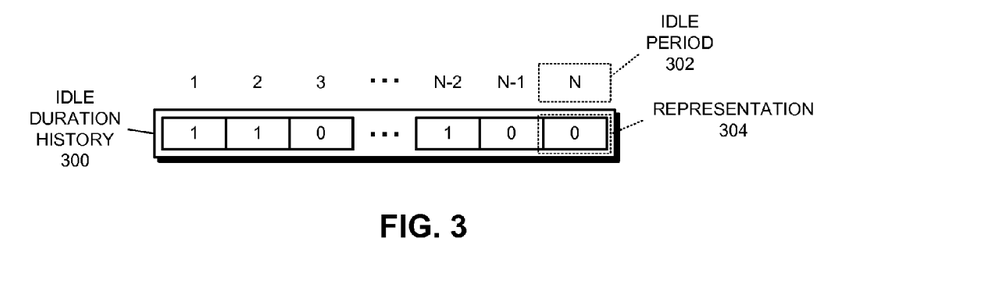
FIG. 3 presents a block diagram illustrating an idle duration history in accordance with some embodiments.

In the described embodiments, entities (e.g., cores 102-106, etc.) for which microcontroller 200 is to predict idle period durations are associated with idle duration histories. Generally, an idle duration history includes a record of the durations of the previous N idle periods for a corresponding entity (where N is a number such as 8, 12, etc.). FIG. 3 presents a block diagram illustrating idle duration history 300 (interchangeably called an "idle duration history record") in accordance with some embodiments. As can be seen in FIG. 3, idle duration history 300 includes records of N idle periods 302, each of which includes a representation 304 of a duration of a corresponding idle period.

In the embodiment shown in FIG. 3, representations 304 are 1-bit values, so that one of 2 different idle period durations can be represented for each idle period 302 in idle duration history 300. For example, in some embodiments, a value of 0 represents an idle period duration that is shorter than a threshold value (e.g., 500 μs, 1 ms, etc.), or a "short" duration idle period, and a value of 1 represents an idle period duration that is longer than the threshold value, or a "long" duration idle period.

During operation, when an idle period ends for an entity, microcontroller 200 (or another functional block in computing device 100) determines a duration of the idle period and uses the duration of the idle period to generate a representation 304. For example, in some embodiments, using the above-described 1-bit representations, microcontroller 200 may compare the duration of the idle period to the threshold value and use a corresponding 0 or 1 representation 304 depending on whether the duration of the idle period exceeds the threshold value. Microcontroller 200 then updates idle duration history 300 using the representation. For example, in some embodiments, microcontroller 200 may overwrite an oldest/least recent representation 304 in idle duration history 300 with the representation 304, or may simply add the representation 304 to a most-recent entry in idle duration history 300 if there are not already N representations 304 stored in idle duration history 300.

Figure 4:
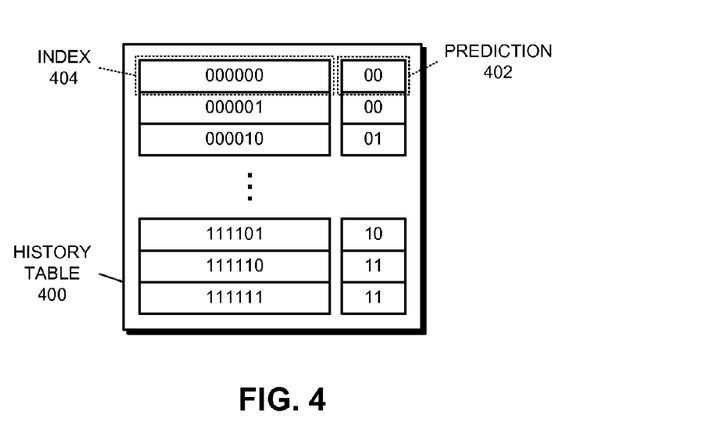
FIG. 4 presents a block diagram illustrating a history table in accordance with some embodiments.

In addition, when predicting a duration of a next idle period, microcontroller 200 (or another functional block in computing device 100) retrieves some or all of the representations 304 from idle duration history 300 to be used in computing an index for a history table 400 (see FIG. 4). For example, microcontroller 200 may copy some or all of representations 304 to a functional block that computes the index.

Although 1-bit representations are used in FIG. 3, in some embodiments, other representations are used, e.g., 2 or more bits and/or another numeric, string, etc. value per idle duration (such as an actual numerical duration of each idle period). More generally, in the described embodiments, a representation may include any value(s) that can represent a duration of an idle period. Note that using a larger number of bits for representations 304 enables microcontroller 200 to record the duration of idle periods more specifically. For example, with 2-bit representations 304, up to 4 idle period durations can be recorded.

In some embodiments, microcontroller 200 dynamically (i.e., at runtime) determines that the number of idle periods 302 in idle duration history 300 is to be adjusted. For example, in some embodiments, upon determining that a given number of incorrect predictions of idle period duration have been made, microcontroller 200 increases or decreases the number of idle periods 302. In some embodiments, microcontroller 200 receives configuration information from system manager 208 or another functional block that causes microcontroller 200 to make the adjustment to the number of idle periods 302.

In some embodiments, idle duration history 300 is stored in a dedicated register or memory circuit in record 202 (or in another functional block in computing device 100). For example, in some embodiments, idle duration history 300 is stored in a dedicated shift register in record 202. In these embodiments, operations such as updating the idle duration history 300 with new representations (after an idle period has ended) are performed using shift operations, e.g., shifting out an oldest representation and shifting in the new representation.

Although embodiments are described using idle duration history 300, in some embodiments, computing device 100 uses a different arrangement of idle durations to perform the operations herein described. Generally, the described embodiments can use any type of record, data structure, etc. that directly or indirectly indicates durations for N previous idle periods.

History Table

In the described embodiments, microcontroller 200 (or another functional block in computing device 100) maintains a history table that is used to predict idle period durations. The history table includes M predictions (where M is a number such as 15, 32, etc.) of a duration for a next idle period. Each of the M predictions is associated with an index that is used to access (e.g., add, retrieve, update, delete, etc.) the prediction. FIG. 4 presents a block diagram illustrating history table 400 in accordance with some embodiments. As can be seen in FIG. 4, history table 400 includes a set of predictions 402 that are associated with indexes 404.

In the embodiment shown in FIG. 4, each prediction 402 is a 2-bit saturating counter, so that each prediction 402 has four possible states. For example, predicted durations of the idle periods may be 00—strongly predicted to be a short-duration idle period, 01—weakly predicted to be a short-duration idle period, 10—weakly predicted to be a long-duration idle period, and 11—strongly predicted to be a long-duration idle period.

During operation, microcontroller 200 determines that a prediction is to be made for a duration of a next idle period for an entity in computing device 100 (e.g., one of cores 102-106, etc.). Microcontroller 200 then acquires an idle duration history from idle duration history 300 for the entity. For example, assuming the above-described embodiment where the representations in representations 304 are 1-bit values, microcontroller 200 retrieves some or all of the representations/bits from idle duration history 300. Microcontroller 200 then computes an index value for history table 400 based on the idle duration history. For example, microcontroller 200 may compute the index value by concatenating some or all of the representations 304 from idle duration history 300 into a single value (as an example, for an embodiment where idle duration history 300 stores 6 representations 304, 1, 1, 1, 1, 0, and 1, microcontroller 200 concatenates the representations 304 into 111101). Microcontroller 200 next uses the computed index value to retrieve a prediction of the duration of the next idle period from history table 400. For example, in some embodiments, microcontroller 200 matches the computed index value against indices 404 in history table 400 until a matching index 404 is found in history table 400 and then retrieves the corresponding prediction 402. Using the above-described concatenated index value 111101 and the predictions 402 shown in FIG. 4, the retrieved prediction is 10. Microcontroller 200 then uses the retrieved prediction as the predicted duration of the next idle period.

In addition, microcontroller 200 maintains the predictions 402 in history table 400 by dynamically updating predictions 402 based on the durations of idle periods for a corresponding entity in computing device 100. In some embodiments, to maintain history table 400, microcontroller 200 first determines the duration of an idle period that has ended for the entity. For example, microcontroller 200 may receive an indication of the duration of the idle period from the entity or may otherwise acquire or determine the duration of the idle period (e.g., monitor the idle period for the entity). Microcontroller 200 then acquires the idle duration history from before the idle period from idle duration history 300. (Note that the prediction that will be updated in history table 400 applies to the idle period that has ended.) Microcontroller 200 next computes an index value for history table 400 based on the idle duration history (as described above). Microcontroller 200 then, based on the duration of the idle period, updates (overwrites, adjusts, etc.) a prediction 402 in history table 400 indicated by the index value.

In some embodiments, predictions 402 are updated according to the configuration of the predictions 402. For example, for the 2-bit saturating counter with the above-described states (weakly predicted to be a short-duration idle period, etc.) shown in FIG. 4, microcontroller 200 compares the duration of the idle period that has ended for the entity to a threshold to determine if the idle period was long. If so, microcontroller 200 updates the prediction 402 by incrementing the counter for the prediction 402. Otherwise, if the idle period was short, microcontroller 200 decrements the counter for the prediction 402. More generally (and independent of the configuration of the predictions 402), the predictions 402 are updated to reflect the durations of the previous idle period.

Although a 2-bit counter is shown for predictions 402, in some embodiments, a different configuration of counter is used for predictions 402. For example, in some embodiments, a 1-bit counter, a 3 or more bit counter, or another value, string, etc. is used for representing predicted durations. Generally, any configuration of prediction 304 can be used that can represent predicted idle period durations.

In addition, in some embodiments, instead of concatenating the retrieved representations 304 to generate the index value for the accessing history table 400, microcontroller 200 computes the index value by computing the result of a function. For example, in some embodiments, microcontroller 200 computes the index value as the result of a hash function, the inputs of the hash function including at least some of the representations 304. In these embodiments, the hash function may include any function that maps the representations 304 to a different (e.g., smaller) value. For example, in some embodiments, the hash function includes one or more bitwise logical operations such as XOR or AND for two or more of the representations 304. Note that these embodiments may experience collisions in history table 400 when the hash function is configured to return the same index for two or more representations 304. However, even when the retrieved prediction for idle period duration is not correct (or is less than optimal), no errors occur; the effect of selecting a sub-optimal prediction for idle period duration is limited to inefficient operation of the entity.

Also, an embodiment is shown in FIG. 4 where indices 404 are 6 bits in length. This configuration of the indices 404 limits history table 400 to 64 predictions (assuming that history table 400 can hold all of the possible 6-bit indices simultaneously). However, in some embodiments, a different number of bits may be used for the indices 404 and thus a corresponding different number of predictions may be held in history table 400. For example, in some embodiments, indices with 5, 12, etc. bits are used in history table 400. Generally, any number of bits that can be operated on in computing device 100 may be used for the indices 404.

Note that, where 1-bit representations 304 are used and index values are computed by concatenating the representations 304, using indices 404 with 6 bits limits the number of representations 304 that can be used to generate an index value for accessing history table 400 to 64. However, using a different number of bits in the indices 404 enables a different bit size for representations (e.g., 2 bits, 4 bits, etc.) and/or a different number of representations to be concatenated. In addition, embodiments that use a hash function (instead of simple concatenation) may be configured to reduce larger numbers of representations 304 to a 6-bit index value.

As shown and described above, when making predictions based on idle duration history 300 as described, these embodiments use a pattern in the representations of previous idle period durations (e.g., 111101 in the example above) to determine an index 404 in history table 400, which is then used to look up a prediction 402 of a duration for the next idle period for an entity. Hence, the prediction of a future idle period's duration is made based on past idle period durations.

Idle States

As described above, in some embodiments, entities in computing device 100 (e.g., cores 102-106 and/or other entities) may encounter idle periods during which the entities are idle and thus should not or do not complete computational work. To conserve power, during the idle period, an entity may transition into an idle state from a set of idle states. The entity may then transition back out of the idle state (e.g., to a full-power state) when the idle period is over. Each idle state in the set of idle states has corresponding settings for one or more operating parameters for the entity (e.g., voltages, controlling clock frequencies, currents, input-output limits, etc.). For example, in some idle states, one or more controlling clocks can be reduced in frequency or halted to one or more parts of the entity (e.g., processing circuits, interrupt circuits, interface circuits, etc.). As another example, in some idle states, one or more input voltages can be reduced (possibly to 0V) for one or more parts of the entity (e.g., processing circuits, interrupt circuits, interface circuits, etc.). For instance, the entity may be logically or physically partitioned into various domains, such as clock domains, voltage domains, etc., so that a portion of the circuits in the entity are controlled by a corresponding clock signal, supplied with a separate voltage signal, etc. In these embodiments, each domain may (or may not) have the corresponding clock frequency, voltage, etc. reduced in an idle state. In some embodiments, the idle states include at least some of the well-known "c-states," C0-C6.

In some embodiments, for at least one of the idle states, an entity is configured to set at least one operating parameter (e.g., voltage, current, clock frequency, etc.) for circuits (e.g., register files, caches, memory elements, dynamic circuits, etc.) that maintain at least some of the architectural state of the entity to a level that is insufficient to maintain the architectural state. For example, in some embodiments, for at least one idle state, the entity is configured to set a voltage to a level sufficiently low (e.g., 0V) that circuits in which architectural state is stored can no longer store the architectural state. In order to transition to such an idle state, and assuming that the entity is to subsequently use the architectural state on transitioning back out of the idle state, the entity first preserves an architectural state of the entity to avoid losing the architectural state. Generally, preserving the architectural state includes performing operations to enable recovering the architectural state of the entity upon exiting the idle state. For example, the entity may flush caches in the entity (i.e., write modified data to a lower-level cache, memory 108, a disk or large semiconductor memory, etc.), copy values of registers, flags, state elements, memories, etc. to a memory associated with the entity (e.g., a dedicated memory, a lower level cache, memory 108, a disk or large semiconductor memory, etc.), and/or otherwise preserve the architectural state. Note that, in such idle states, preserving the architectural state causes a delay when transitioning into the idle state and recovering the architectural state causes a delay when transitioning back out of the idle state. In some embodiments, an idle state for which architectural state is preserved before transitioning to the idle state is the C6 idle state.

Idle State Determination

Figure 5:
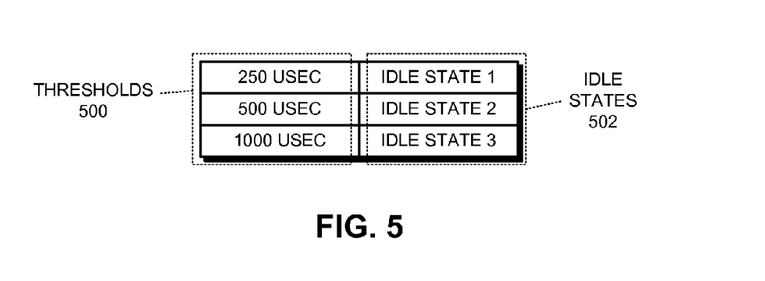
FIG. 5 presents a block diagram illustrating thresholds and idle states in accordance with some embodiments.

In the described embodiments, after computing the predicted duration of the idle period for an entity (for this example, core 102) as described above, microcontroller 200 uses the predicted duration of the next idle period to determine an idle state to which core 102 is to transition during a next idle period. To enable making the determination, microcontroller 200 may include/maintain a set of idle period duration thresholds, each of which is associated with at least one idle state. For example, microcontroller 200 may include one or more minimum duration thresholds, maximum duration thresholds, etc., each of which is associated with a corresponding idle state. FIG. 5 presents a block diagram illustrating thresholds 500 and idle states 502 in accordance with some embodiments. As can be seen in FIG. 5, microcontroller 200 includes thresholds 500 at 250 μs, 500 μs, and 1000 μs, along with corresponding idle states 502 (i.e., idle states 1-3). In these embodiments, if the predicted duration of the idle period is below 250 μs, microcontroller 200 causes core 102 to transition to idle state 1 during the next idle period, if the predicted idle period duration is above 250 μs, but below 500 μs, microcontroller 200 causes core 102 to transition to idle state 2 during the next idle period, etc. In other words, upon computing a predicted duration for the next idle period of 250 μs or less for core 102, during the next idle period for core 102, microcontroller 200 causes core 102 to transition from a full power operating state (in which core 102 operates before the idle period) into idle state 1.

Idle states 502 can include any idle states supported by core 102. In some embodiments, longer predicted idle period durations/higher thresholds 500 may be associated with idle states that involve performing more architectural state preservation operations (e.g., copying values in registers, values in caches, state variables, etc. to disk, to a memory, to a lower-level cache, and/or to another location, etc.), as core 102 is predicted to be in the idle state for a sufficiently long duration to make the preservation operations worthwhile (in terms of the time, power, bus bandwidth, etc. consumed for performing the preservation operations). Similarly, in some embodiments, shorter idle period durations/lower thresholds 500 may be associated with idle states that involve performing less architectural state preservation operations. Thus, for shorter predicted idle period durations, an idle state with clock frequencies, voltages, currents, etc. sufficiently high to maintain architectural state in corresponding portions of core 102 may be selected so that at least some of the architectural state need not be preserved to enable transitioning to the idle state.

In some embodiments, causing core 102 to transition to a given idle state during the idle period includes setting one or more power-gating control values that control when one or more power-related operations are performed by the entity in the corresponding idle state. For example, in some embodiments, a cache-flush timer for core 102 may be set to a larger value (longer time) to prevent cache flushing for idle periods predicted to be of shorter duration and may be set to a smaller value to enable/cause quicker cache flushing for idle periods predicted to be of longer duration. Generally, in these embodiments, any variable or value that controls when an entity performs one or more power-saving and/or other operations can be set in accordance with the idle state to which the entity is to transition.

In some embodiments, one or more of the thresholds in thresholds 500 may be dynamically adjusted based on one or more factors for core 102, cores 104-106, computing device 100, etc. For example, thresholds 500 may be dynamically adjusted based on an operating state for core 102, cores 104-106, and/or computing device 100 (e.g., a clock frequency and/or voltage at full power, an operating system limit, a number of applications being executed, a number of busy entities in the computing device 100, etc.), an amount of architectural state to be copied to a memory and/or restored (e.g., modified data in caches in core 102, data in local memory circuits, etc.), prior idle period duration prediction errors, desired responsiveness of computing device 100, and/or other factors.

In some embodiments, microcontroller 200 uses data (or metadata) collected from one or more functional blocks in addition to core 102 (e.g., via sensor signals 206) when computing the predicted duration of the next idle period. For example, in some embodiments, microcontroller 200 uses data collected from memory 108, I/O devices 110, and/or power supply 112 such as temperature data, idleness data, I/O levels, number of communications with core 102, clock frequencies, voltage and current levels, etc. as an operational history of the other functional block(s). The operational history may be combined with data collected from core 102 to form an enhanced history. The enhanced history can then be used when computing the prediction of the duration of a next idle period, including adjusting or correcting a prediction made using the above-described operations. For example, an I/O level just before each of a last Y idle periods can be acquired from I/O devices 110 and/or a number of memory accesses just before each of a last Y idle periods can be acquired from memory 108, and these values can be compared to present values to help determine if a prediction of a duration of an idle period is likely to be correct and, if not, by how much the predicted duration should be adjusted.

Determining an Idle State for an Entity

Figure 6:
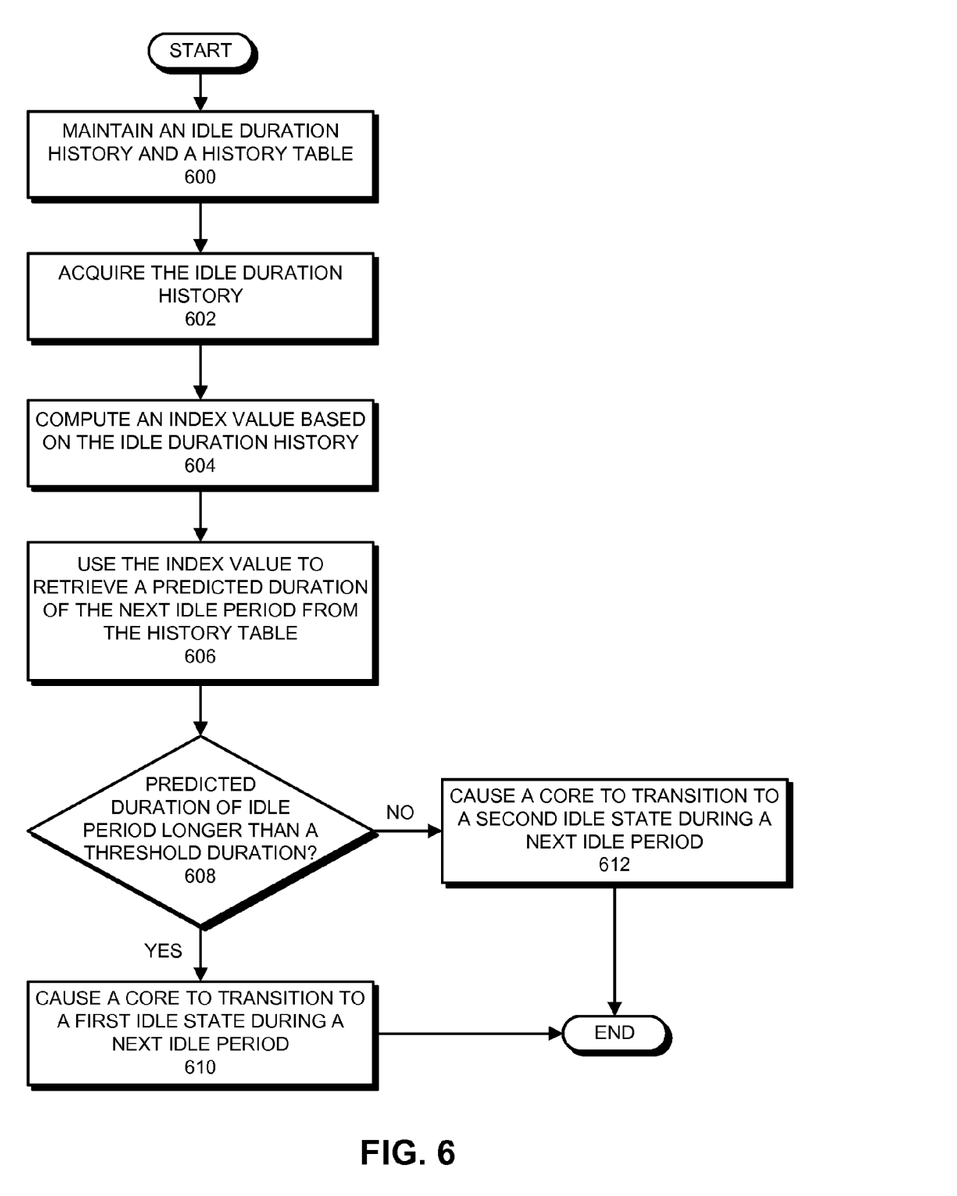
FIG. 6 presents a flowchart illustrating a process for using an idle duration history and a history table to determine an idle state for an entity in a computing device in accordance with some embodiments.

FIG. 6 presents a flowchart illustrating a process for using an idle duration history and a history table to determine an idle state for an entity in a computing device in accordance with some embodiments. More specifically, in FIG. 6, a process is shown in which microcontroller 200 uses idle duration history 300 and history table 400 to predict a duration of a next idle period for core 102. Based on the predicted duration of the next idle period, microcontroller 200 determines an idle state to which core 102 is to transition during the next idle period.

Note that the operations shown in FIG. 6 are presented as a general example of operations performed by some embodiments. The operations performed by other embodiments include different operations and/or operations that are performed in a different order. Additionally, although certain mechanisms (microcontroller 200, core 102, etc.) are used in describing the operations, in some embodiments, other mechanisms can perform and/or can be used to perform the operations. For example, in some embodiments, a core such as core 102 or 104 and/or a co-processor performs the operations described as being performed by microcontroller 200. As another example, in some embodiments, the idle state is determined for an entity other than core 102 (e.g., core 104 or 106, etc.).

The process shown in FIG. 6 starts when microcontroller 200 maintains an idle duration history and a history table (step 600). In some embodiments, maintaining the idle duration history includes updating idle duration history 300 as described above (e.g., in the description of FIG. 3) so that idle duration history 300 includes a record of the durations of the last N idle periods. In some embodiments, maintaining the history table includes updating history table 400 as described above (e.g., in the description of FIG. 4) so that history table 400 includes updated predictions 402 for idle period durations.

Note that, when idle duration history 300 and history table 400 are maintained as described, the predictions 402 in history table 400 are associated with indices 404 that are computed from corresponding patterns of idle period durations. Thus, each prediction 402 is a prediction of a duration of a next idle period to occur after the corresponding pattern of previous idle period durations. For example, with the 1-bit representations (where a 0 represents a short-duration idle period and a 1 represents a long-duration idle period) and the history table 400 shown and described above, the 2-bit prediction 402 following a pattern of idle period durations 111101 (i.e., long, long, long, long, short, long) is 10, or weakly predicted to be a long-duration idle period. As described above, predictions 402 are dynamically updated in accordance with the actual durations of idle periods.

Microcontroller 200 then determines that an idle state is to be determined for a next idle period for core 102. For example, microcontroller 200 may receive a signal that an idle period has ended from core 102 and/or another functional block, may determine (e.g., via monitoring core 102) that an idle period has ended for core 102, may receive a signal requesting the determination of the idle state from core 102 or another functional block, and/or may otherwise determine that the idle state is to be determined.

Next, microcontroller 200 acquires the idle duration history from idle duration history 300 (step 602). During this operation, microcontroller 200 reads some or all of representations 304 from idle duration history 300. Microcontroller 200 therefore acquires representations of a last N idle period durations, which indicate a pattern of the durations of the last N idle periods, such as the long, long, long, long, short, long duration pattern indicated by the above-described pattern 1,1,1,1,0, and 1.

Microcontroller 200 then computes an index value based on the idle duration history (step 604). Generally, during this operation, microcontroller 200 uses the representations 304 from idle duration history 300 to create an index value that will be used to retrieve a predicted duration of the idle period from history table 400. For example, in some embodiments, computing the index value comprises concatenating the representations 304 in idle duration history 300 to form the index value. As another example, in some embodiments, a hash function (e.g., performing one or more corresponding logical, mathematical, shifting, reducing, replacing combining, etc. operations) is used to compute an index value using the representations 304 in idle duration history 300. By using the representations 304 as indicated, these embodiments use the pattern of durations of the last N idle periods to compute the index value.

Microcontroller 200 next uses the index value to retrieve a predicted duration of the next idle period from history table 400 (step 606). For example, microcontroller 200 may perform a comparison of the index value with indices 404 in history table 400 to find an index 404 that matches the index value. Microcontroller 200 then retrieves the corresponding prediction from history table 400 and uses the prediction as the predicted duration of the next idle period. Note that it is assumed here that such an index 404 exists in history table 400 and that the index 404 has a prediction. In some embodiments, if the index 404 does not exist in history table 400 and/or the index 404 does not have a prediction, an error handling routine can be performed. For example, a default prediction may be used, no prediction may be used (which means that no idle state is pre-selected or a default idle state is selected), etc.

In the embodiments described for FIG. 6, core 102 supports at least two idle states: (1) a first idle state in which core 102 is configured to set at least one operating parameter (e.g., voltage, current, clock frequency, etc.) for circuits (e.g., register files, caches, memory elements, dynamic circuits, etc.) that maintain at least some of the architectural state of core 102 to a level that is insufficient to maintain the architectural state, and (2) a second idle state in which core 102 is configured to set at least one operating parameter for the circuits that maintain at least some of the architectural state of core 102 to a level that is sufficient to maintain the architectural state. For example, one or more voltages may be set to 0 V in the first idle state, but may be maintained at 1.2 V, 1.5 V, and/or other voltages in the second idle state. In these embodiments, any architectural state that is to be used upon transitioning back out of the first idle state should be preserved before transitioning into the first idle state (the preservation of architectural state is described above). Preserving the architectural state has a cost in terms of the time taken to preserve the architectural state and recover the architectural state (when subsequently exiting the idle state), the power consumed when performing the operations to preserve the architectural state and recover the architectural state, the use of bandwidth on buses, in memory 108, etc. in computing device 100, the business of core 102 when performing the operations to preserve the architectural state and recover the architectural state, and/or other aspects of performing the operations to preserve the architectural state and recover the architectural state. Generally, a threshold duration is set such that the cost of entering the first idle state is at least offset by the benefits of transitioning to the first idle state during the next idle period, where the benefits of transitioning to the first idle state are power savings, cooling of the processor, reduced load on buses in computing device 100, etc. In some embodiments, averages, estimates, approximations, etc. of the various costs are used to determine a threshold duration. For example, in some embodiments, the time taken to preserve the architectural state and recover the architectural state may be used as an initial value for the threshold duration and then adjustments may be made for the other costs (e.g., to offset power consumption, etc.). However, in some embodiments, the threshold duration is generally not be less than the time taken to preserve the architectural state and recover the architectural state, as core 102 might be delayed (if the predicted duration is correct) simply waiting for the transition into and back out of the first idle state.

If the predicted duration of the idle period is longer than the threshold duration (step 608), microcontroller 200 causes core 102 to transition to the first idle state during the next idle period (step 610). For example, microcontroller 200 can set a flag in a register, signal core 102, respond to an inquiry message from core 102, and/or otherwise cause core 102 to transition to the first idle state during the next idle period. As described above, for the first idle state, any architectural state that is to be used upon transitioning back out of the first idle state should be preserved before transitioning into the first idle state.

If the predicted duration of the idle period is shorter than the threshold duration (step 608), microcontroller 200 causes core 102 to transition to the second idle state during the next idle period (step 612). For example, microcontroller 200 can set a flag in a register, signal core 102, respond to an inquiry message from core 102, and/or otherwise cause core 102 to transition to the first idle state during the next idle period.

In some embodiments, a computing device (e.g., computing device 100 and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/CPUs, application-specific integrated circuit (ASIC) chips, field-programmable gate arrays (FPGAs), caches/cache controllers, compute units, embedded processors, GPUs/graphics cores, pipelines, APUs, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits (e.g., processing circuits, logic circuits, control circuits, etc.) that perform the described operations. In some embodiments, functional blocks include general purpose circuits (e.g., pipelines, compute units, etc.) that execute program code (e.g., microcode, firmware, applications, etc.) and/or may be configured to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a computing device, comprising:
    in a controller in the computing device, performing operations for:
    based on an idle duration history for an entity in the computing device, predicting a duration of a next idle period for the entity, wherein predicting the duration of the next idle period comprises:
        acquiring the idle duration history from an idle duration history record;
        computing an index value for a history table based on the idle duration history;
        retrieving a prediction of the duration of the next idle period from the history table, the retrieving comprising comparing the index value to indices in the history table to find a matching index in the history table and retrieving the prediction associated with the matching index; and
        setting the predicted duration of the next idle period based on the retrieved prediction; and based on the predicted duration of the next idle period, configuring the entity to operate in a corresponding idle state.

2. The method of claim 1, wherein, for each of one or more previous idle periods, the idle duration history record includes a representation of a duration of the idle period.

3. The method of claim 1, further comprising:
maintaining the idle duration history record by:
for each of one or more idle periods prior to the next idle period,
upon completing the idle period, determining a duration of the idle period;
generating a representation of the idle period; and
updating the idle duration history record to include the representation.

4. The method of claim 1, further comprising:
maintaining the history table by:
for each of one or more idle periods prior to the next idle period,
upon completing the idle period, determining a duration of the idle period;
acquiring a prior idle duration history from before the idle period from the idle duration history record;
computing an index value based on the prior idle duration history; and
updating a prediction in the history table indicated by the index value based on the duration of the idle period.

5. The method of claim 1, wherein computing the index value for the history table based on the idle duration history comprises:
computing the index value as a result of a hash function, wherein the idle duration history is an input to the hash function.

6. The method of claim 1, wherein the prediction retrieved from the history table comprises an indication that the predicted duration is one of two or more durations, wherein each duration is associated with a corresponding idle state in which the entity is to be configured to operate based on the prediction.

7. The method of claim 1, wherein, based on the predicted duration of the next idle period, configuring the entity to operate in the corresponding idle state comprises:
determining a relationship of the predicted duration of the next idle period to one or more thresholds, the thresholds associated with corresponding idle states; and
based the determined relationship, causing the entity to operate in one of the corresponding idle states.

8. The method of claim 7, wherein causing the entity to operate in a corresponding idle state comprises:
setting one or more power-gating control values, the power-gating control values controlling when one or more power-related operations are performed by the entity in the corresponding idle state.

9. A computing device, comprising:
thermal power management unit; and
an entity coupled to the thermal power management unit;
wherein the thermal power management unit is configured to:
based on an idle duration history for the entity, predict a duration of a next idle period for the entity, wherein, when predicting the duration of the next idle period, the thermal power management unit is configured to:
acquire the idle duration history from an idle duration history record;
compute an index value for a history table based on the idle duration history;
retrieve a prediction of the duration of the next idle period from the history table, the retrieving comprising comparing the index value to indices in the history table to find a matching index in the history table and retrieving the prediction associated with the matching index; and
set the predicted duration of the next idle period based on the retrieved prediction; and
based on the predicted duration of the next idle period, configure the entity to operate in a corresponding idle state.

10. The computing device of claim 9, wherein, for each of one or more previous idle periods, the idle duration history record includes a representation of a duration of the idle period.

11. The computing device of claim 9, wherein the thermal power management unit is further configured to:
maintain the idle duration history record by:
for each of one or more idle periods prior to the next idle period,
upon completing the idle period, determining a duration of the idle period;
generating a representation of the idle period; and
updating the idle duration history record to include the representation.

12. The computing device of claim 9, wherein the thermal power management unit is further configured to:
maintain the history table by:
for each of one or more idle periods prior to the next idle period,
upon completing the idle period, determining a duration of the idle period;
acquiring a prior idle duration history from before the idle period from the idle duration history record;
computing an index value based on the prior idle duration history; and
updating a prediction in the history table indicated by the index value based on the duration of the idle period.

13. The computing device of claim 9, wherein, when computing the index value for the history table based on the idle duration history, the thermal power management unit is configured to:
compute the index value as a result of a hash function, wherein the idle duration history is an input to the hash function.

14. The computing device of claim 9, wherein the prediction retrieved from the history table comprises an indication that the predicted duration is one of two or more durations, wherein each duration is associated with a corresponding idle state in which the entity is to be configured to operate based on the prediction.

15. The computing device of claim 9, wherein, when, based on the predicted duration of the next idle period, configuring the entity to operate in the corresponding idle state, the thermal power management unit is configured to:
determine a relationship of the predicted duration of the next idle period to one or more thresholds, the thresholds associated with corresponding idle states; and
based the determined relationship, cause the entity to operate in one of the corresponding idle states.

16. The computing device of claim 15, wherein, when causing the entity to operate in a corresponding idle state, the thermal power management unit is configured to:

set one or more power-gating control values, the power-gating control values controlling when one or more power-related operations are performed by the entity in the corresponding idle state.

17. A computer-readable storage medium storing instructions that, when executed by a computing device, cause the computing device to perform a method, the method comprising:

based on an idle duration history for an entity in the computing device, predicting a duration of a next idle period for the entity, wherein predicting the duration of the next idle period comprises:
acquiring the idle duration history from an idle duration history record;
computing an index value for a history table based on the idle duration history;
retrieving a prediction of the duration of the next idle period from the history table, the retrieving comprising comparing the index value to indices in the history table to find a matching index in the history table and retrieving the prediction associated with the matching index; and
setting the predicted duration of the next idle period based on the retrieved prediction; and
based on the predicted duration of the next idle period, configuring the entity to operate in a corresponding idle state.

* * * * *